United States Patent Office.

P. BAUMANN, JR., OF NEW ATHENS, ILLINOIS, ASSIGNOR TO P. BAUMANN & BROTHERS, OF SAME PLACE.

*Letters Patent No. 67,706, dated August 13, 1867.*

---

IMPROVED LINIMENT.

---

*The Schedule referred to in these Letters Patent and making part of the same.*

---

TO ALL WHOM IT MAY CONCERN:

Be it known that I, P. BAUMANN, Jr., of New Athens, in the county of St. Clair, and State of Illinois, have invented a new and useful Liniment; and I do hereby declare that the following is a full and exact description of the several ingredients composing the same.

The liniment which I shall describe has been found very efficacious in curing strains, spavin, galls, scratches, and other diseases in horses, and it may be used with success in many inflammatory diseases of the human body.

The ingredients composing the mixture consist of spirits camphor, petroleum, oil spike, lavender, oil of turpentine, ammonia water, oil of linseed, liquid pitch. These substances being mixed together in about the following proportions, produce the liniment in question: One-half gallon petroleum, one-fourth gallon of oil of spike, one-eighth gallon spirits of camphor, one-eighth gallon spirits of turpentine, one-sixteenth gallon ammonia water, one-fourth gallon linseed oil, one-eighth gallon liquid tar.

The camphor is used because it is sedative and narcotic; it will allay pain and swelling, and act as a stimulant. Petroleum is a stimulant and rubefacient, and is very penetrating. Oil lavender is also a stimulant; it promotes granulation in indolent ulcers, burns, and other sores. Oil turpentine is a stimulant, rubefacient, and vesicant; it is used to allay pain and reduce swelling, and to assist granulation in cuts, ulcers, and other sores. Ammonia is a stimulant, rubefacient, and antiseptic; it is used also to allay pain and swelling. Linseed oil is an emollient; it is used to allay irritation, and to form an artificial coating over ulcerated surfaces, so as to obviate irritation from the effects of air, insects, &c. This oil will modify the irritating effects of some of the other substances used. The pitch (*Pix liquida*) is healing, but it is used chiefly to give consistence to the compound.

Having described my invention, what I claim as new, and desire to secure by Letters Patent, is—

The liniment herein described, composed of the several ingredients mixed together in about the proportions set forth.

P. BAUMANN, Jr.

Witnesses:
    WILLIAM SCHILD,
    WILLIAM KUEHN.